Jan. 20, 1970 H. O. POHL ET AL 3,490,238
TWO-STEP ROCKET ENGINE BIPROPELLANT VALVE
Filed Feb. 6, 1969 3 Sheets-Sheet 1

Henry O. Pohl
Jack E. Capps
Richard B. Ferguson
INVENTORS

BY
ATTORNEY

Henry O. Pohl
Jack E. Capps
Richard B. Ferguson
INVENTORS

——— POSITION 1
---------- POSITION 2
— — — POSITION 3

United States Patent Office 3,490,238
Patented Jan. 20, 1970

1

3,490,238
TWO-STEP ROCKET ENGINE BIPROPELLANT VALVE
Henry O. Pohl, Seabrook, Jack E. Capps, La Porte, and Richard B. Ferguson, Seabrook, Tex., assignors to the United States of America as represented by the Administrator of the National Aeronautics and Space Administration
Filed Feb. 6, 1969, Ser. No. 797,057
Int. Cl. F02k 9/02; F02c 7/26
U.S. Cl. 60—258                                    10 Claims

ABSTRACT OF THE DISCLOSURE

Propellant flow to an auxiliary propulsion rocket such as is used for stability and navigational control of space vehicles may be selectively regulated between two flow rate control positions for propulsive throttling with a single, snap-acting solenoid valve by providing two, valve controlled, propellant conduits respectively sized for the two predetermined flow rates selected. The lower flow conduit is constructed to discharge into a precombustion chamber positioned within the auxiliary rocket engine main combustion chamber. The higher flow conduit discharges directly into the auxiliary rocket engine combustion chamber. Valve opening for the low and high flow conduits is sequentially effected by a single motor element in the following order:

(1) both conduits closed;
(2) low flow conduit open; high flow conduit closed; and,
(3) both conduits open.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to the control of propellant fluid injection into the combustion chamber of an internal combustion engine. More specifically, this invention relates to apparatus for dual flow rate cotrol of propellants to a reaction propulsion engine for the purpose of generating two distinct maximum thrust levels therefrom.

Attitude and roll control of space vehicles is normally accomplished by a plurality of strategically placed small rocket engines that are operated automatically in response to signals from various respective sensor systems. These rockets may be of the pyrotechnic, hypergolic, or monopropellant type. When started in the hard vacuum of outer space, these engines tend to generate high pressure surges or spikes in the combustion chamber thereof at the moment combustion is initiated.

It has been found that such pressure spikes may be reduced by initiating combustion in a smaller chamber or "precombustion" chamber that is isolated from the main combustion chamber but fires into it. The engine is started by injecting a reduced flow of propellants into the precombustion chamber to initiate stable combustion. Subsequently, full propellant flow may be directed into the main chamber for full thrust, without fear of large pressure spikes.

BRIEF DESCRIPTION OF THE DRAWINGS

These and other objects of the present invention may be more readily understood by reference to the following detailed description of the drawing wherein:

2

Figure 1:
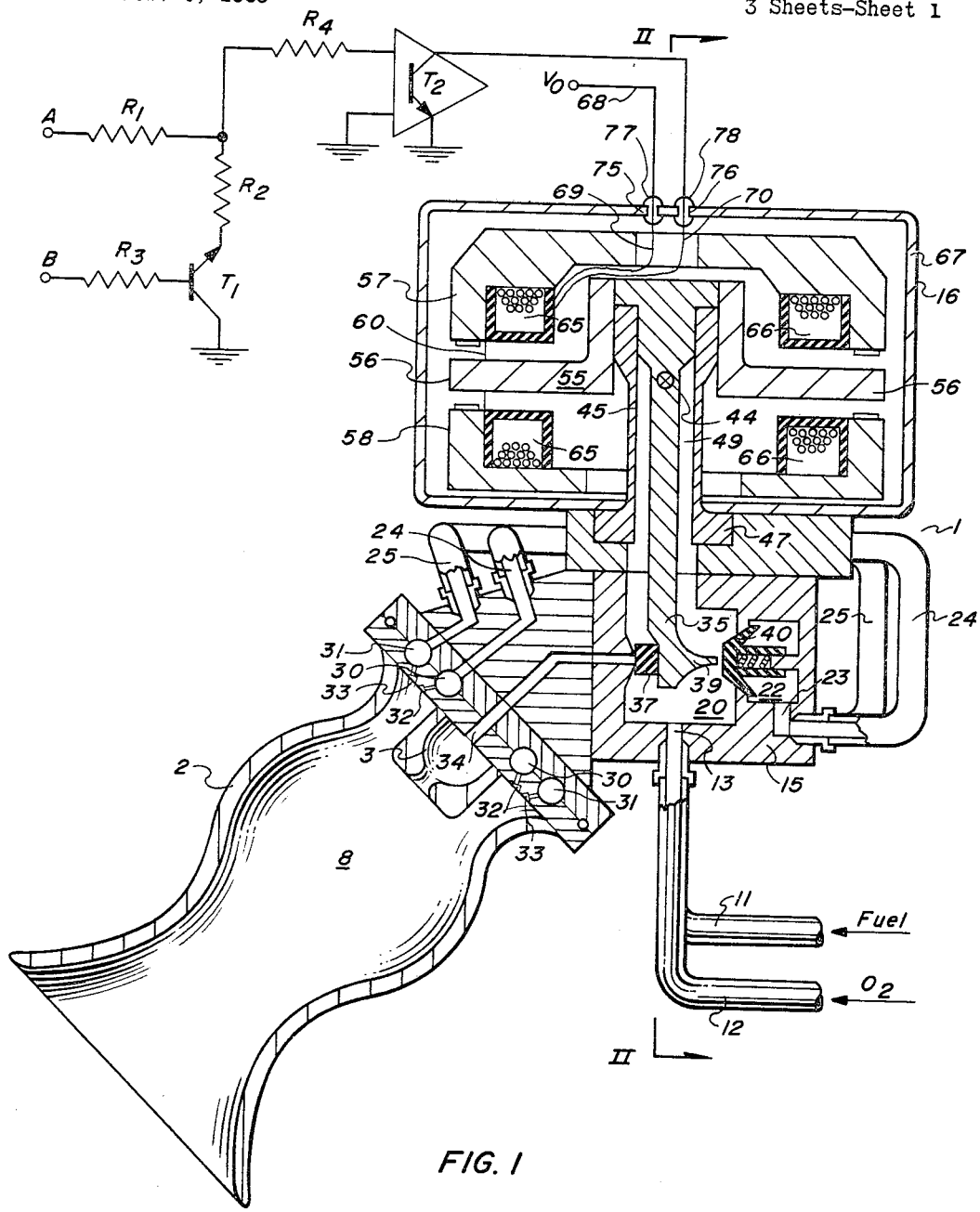

FIGURE 1 is a partial sectional elevation of a rocket engine-propellant flow control system assembled as a composite unit accordiig to the present invention.

Figure 2:
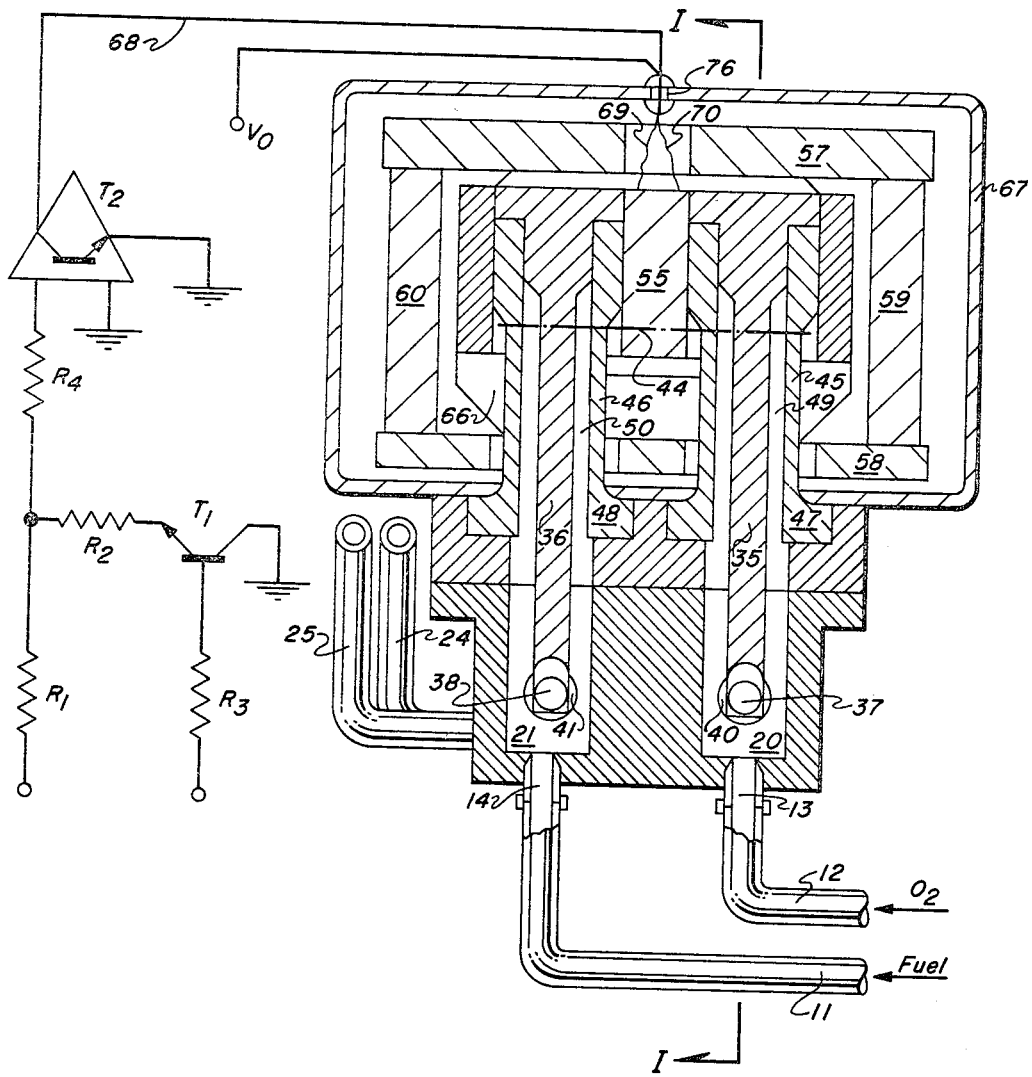

FIGURE 2 is a partial sectional elevation of the invention taken along cut lines II—II of FIGURE 1.

Figure 3:
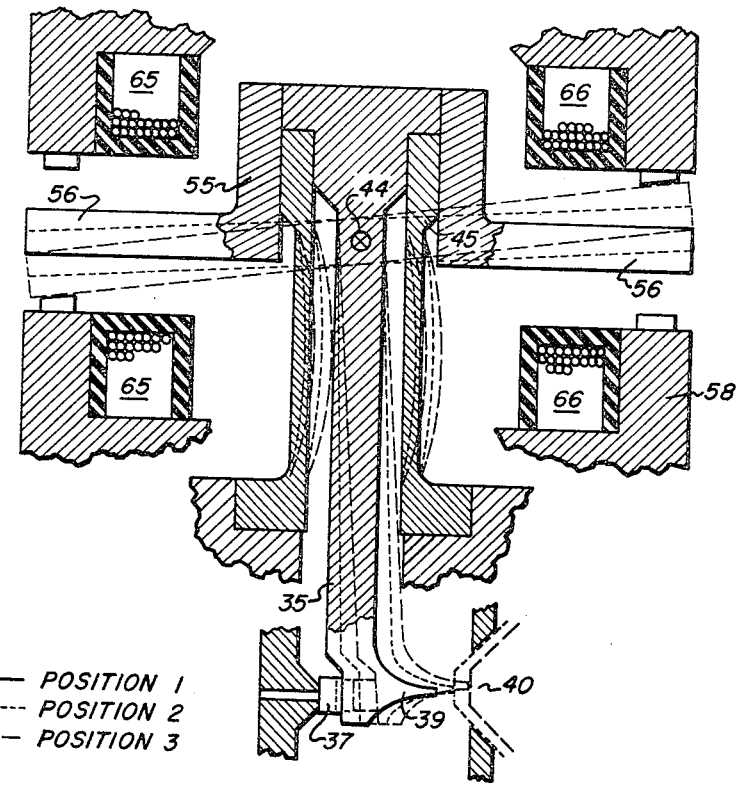

FIGURE 3 is a partial view of the propellant control elements showing the operative positions of same under the several conditions of operation.

DESCRIPTION OF PREFERRED EMBODIMENT

With respect to FIG. 1, a rocket engine 2 comprises a primary combustion chamber 8 and a precombustion chamber 3. In the case of bipropellant hypergolic fueled engines as described here for example, separate conduits are used for fuel and oxidizer respectively. Conduit 34 carries the oxidizer to precombustion chamber 3. Another conduit, not illustrated, carries the fuel to precombustion chamber 3 in like manner.

The engine primary combustion chamber 8 is supplied with propellant by high flow oxidizer line 24 and high flow fuel line 25. Lines 24 and 25 discharge their respective flow streams into manifold rings 30 and 31. A multiplicity of injection orifices 32 and 33 communicate the manifold rings 30 and 31 with the primary combustion chamber 8.

The flow of propellant fluid through the respective combustion chamber propellant supply conduits is controlled by a solenoid actuated snap acting valve assembly generally comprising a valve body portion 15 and a solenoid motor portion 16.

Fuel and oxidizer fluid is normally supplied to the valve 1 from pressurized reservoirs, not shown, through fuel and oxidizer supply conduits 11 and 12, respectively, to valve inlet ports 13 and 14, respectively (FIG. 2).

The valve body 15 is provided with respective fuel and oxidizer manifold chambers 20 and 21. Spring biased check or unidirectional flow control valves 40 and 41 normally obstruct a conduit between the main manifold chambers 20 and 21 and respective high flow chambers such as 22 for the oxidizer circuit. Discharge ports such as 23 communicate the fuel and oxidizer high flow chambers with respective high flow conduits 24 and 25.

Propellant flow through the low flow conduits 34 is controlled by buttons 37 and 38 secured to respective flapper stems 35 and 36. The buttons 37 and 38 may be fabricated from a plastic material having chemical properties compatible with the particular fuel or oxidant associated therewith.

Diametrically opposite of the buttons 37 and 38, the flapper stems 35 and 36 are provided with respective flapper fingers 39. The length of said fingers 39 relative to the check valve structure 40 and 41 will become apparent from the following description of operation.

The flapper stems 35 and 36 are generally cylindrical rods of stiffly resilient material. The top portion of both stems 35 and 36 are rigidly secured to a single motor armature element 55 as by press fitting for example. The armature-stem assembly is held in relative position by hollow cylindrical column members 45 and 46, characterized here as flexure tubes. The upper end of flexure tubes 35 and 36 are also rigidly secured to motor armature 55, as by press fit for example. The lower ends 47 and 48 of the flexure tubes are enlarged and faced off square for press fit seating in counterbores in the valve body 15.

Motor armature 55 includes torquing arms 56 projecting in opposite directions from the plane common to the center lines of flapper stems 35 and 36. Said torquing arms pass through the loop openings of motor coils 65 and 66 and the air gap between permanent magnets 57 and 58. These magnets 57 and 58 along with side magnets 59 and 60 (FIG. 2) are rigidly secured together and to the valve body 15 by conventional means such as screw fasteners. A protective housing 67 may be provided to enclose the entire motor apparatus for protection from an injurious environment.

Motor coils 65 and 66 are energized by means of an electrical power circuit 68 charged with a potential $V_0$, 24 volts D-C for example. Current in the power circuit 68 and hence, through motor coils 65 and 66, may be controlled by means of a logic circuit comprising transistors $T_1$ and $T_2$ and resistors $R_1$, $R_2$, $R_3$, and $R_4$. Electrical control signals generated by automatic roll rate sensing devices or by manual over-ride controls, for example, are introduced to the logic circuit at terminals A and B. Grommets 77 and 78 inserted in housing apertures 75 and 76 provide sealed entrance to the interior of housing 67 for electric power conduits 69 and 70.

OPERATION

Prerequisite to "firing" of the engine 2, it is necessary to flood both manifold chambers 20 and 21 with propellant at a predetermined pressure. This may be accomplished by means of a regulated, inert gas pressure drive within propellant tanks, not shown, pushing the propellant through supply conduits 11 and 12. Since the annuli 49 and 50 between flapper stems 35 and 36 and flexure tubes 45 and 46 are in open communication with respective manifold chambers 20 and 21, it is necessary that the fit relationship between the upper ends of said flapper stems and flexure tubes is fluid tight. Similarly, the fit relationship between the enlarged bases 47 and 48 of said flexure tubes and the counterbored valve body seats for same also be fluid tight.

The opening of low flow conduits 34 and check valves 40 and 41 occurs sequentially upon sufficient energization of motor coils 65 and 66. When it is desired to establish stabilized combustion conditions within the engine 2 precedent to charging the main combustion chamber 8, or to sustain a low but continuous thrust from the engine 2, only the fuel and oxidizer low flow conduits 34 will be opened by the removal of the respective flapper buttons 37 and 38 from the opening apertures thereof. Since the cylinder walls of flexure tubes 45 and 46 constitute a resilient bias to the rotational displacement of flapper stems 35 and 36 about the theoretical axis 44, only sufficient power as determined by an automatic sensing device or human operator need be applied to the motor coils 65 and 66 to overcome such bias. The external effect of such a sensor or operator would be to select the path of an input signal to logic circuit 68. In the case of a spacecraft equipped with the present invention needing a small attitude change, an electrical signal would be automatically or manually introduced to the logic circuit 68 at terminal B. Such a signal would saturate (allow full conduction) transistor $T_1$ and allow part of the driving current to shunt to ground. The reduced driving current would be insufficient to saturate transistor $T_2$, thus, allowing it to partially conduct making it act like a voltage divider and therefore taking a portion of the voltage that would otherwise operate on the valve. When such reduced power is applied to the coils 65 and 66, electromagnetic flux across the air gap between magnets 57 and 58 acts upon torque arms 56 thereby causing the armature 55 and flapper stems 35 and 36 to rotate about the theoretical axis 44. This action is best illustrated by the dotted line position of appropriate elements in FIG. 3.

Such rotation of the flapper stems 35 and 36 moves the buttons 37 and 38 away from the opening apertures of low flow fuel and oxidizer conduits 34 to allow the respective propellants to flow from fuel and oxidizer manifold chambers 21 and 20 into the restrictive volume of the precombustion chamber 3 where the probabilities for complete and immediate mixing of the respective propellants under space vacuum conditions is increased over the alternative method of initiating combustion by first introducing propellant flow into the larger evacuated volume of the main combustion chamber 8. Such procedure allows the creation of immediate, stable combustion conditions which may be efficiently sustained for low thrust level operations from an engine having considerably greater thrust capacity. Also, the procedure allows the momentary establishment of stable combustion conditions within the main combustion chamber prior to the introduction of full or maximum propellant flow thereto. In this way, pressure "spikes" or bomb conditions for engine starting are reduced.

The check valve 40 is designed to require greater than minimal cracking force for opening to provide a rigid abutment surface for the flapper stem finger 39 under the power range impressed for opening the low flow conduits.

When spacecraft sensors indicate the need of a large correction force, such as for a translation maneuver, for example, an electrical signal is introduced to the logic circuit 68 at terminal A. This would not cause current flow through transistor $T_1$ therefore causing the total driving current to be directed to transistor $T_2$. Consequently, $T_2$ saturates and allows most of the available voltage $V_0$ to operate on the valve motor coils 65 and 66. When such increased power is applied, the restraining forces of flexure tubes 45 and 46 and check valves 40 and 41 are overcome with the result that flapper stem fingers 39 displace the aperture obsturating elements of check valves 40 and 41 to open communication between chambers 20 and 22 and chambers 21 and 23, respectively. This action is illustrated by the dash line showing of appropriate elements in FIG. 3. Although the particular form of check valve illustrated for purposes of this description is a spring biased, reciprocating pintle means, it should be understood that numerous other check valve types are appropriate for the purposes of this invention such as a spring biased ball or a reed valve.

When valves 40 and 41 are opened, propellant flow is conducted to manifold rings 30 and 31 in addition to the continued flow of propellant through low flow conduits 34. From the manifold conduits 30 and 31, propellant is distributed in a mixing ring within the main combustion chamber 8 from the plurality of injector orifices 32 and 33.

Since establishment of stable combustion conditions within the combustion chamber has preceded the initial impulse of fluid from the high propellant flow circuits, these fluids will be smoothly and immediately mixed and reacted or ignited by the turbulent combustive environment prevailing.

When it is desired to terminate operation of engine 2, the signal input at logic circuit terminals A or B is removed thereby causing current flow through motor coils 65 and 66 to cease. This will allow the resilient bias of flexure tubes 45 and 46 to relax to a minimal stress condition and close both high and low flow conduits. It should be understood, however, that some residual static preload should be designed into the flexure tube-flapper stem system to maintain a positive sealing force on the buttons 37 and 38 so as to prevent leaks through the low flow conduits 34 under "all-off" conditions.

Obviously, many modifications and variations of the present invention are possible in the light of the above teachings. For example, any number of propellants or other fluids may be handled separately by merely multiplying the number of fluid handling circuits described herein with all flapper stems attached to a single armature element 55. Also, motor coils 65 and 66 may be energized independently of the logic circuit described herein by means of a power source controlled by a simple 2-pole switch. It is, therefore, to be understood that the invention may be practiced other than as specifically described.

What is claimed is:

1. A reaction propulsive system comprising:

rocket engine means and fluid propellant flow control means;
said rocket engine means including precombustion chamber means disposed within primary combustion chamber means;
said fluid propellant flow control means comprising at least two propellant conduits to said engine means, one of said conduits being adapted to flow a lesser quantity of fluid propellant than the other of said conduits, said conduits originating from a single distribution chamber;
said one conduit terminating in said precombustion chamber means;
said other conduit terminating in said primary combustion chamber means;
conduit obturating means disposed in each of said conduits; and,
valve actuating means adapted to sequentially move from a first position wherein all conduits are closed by said obturating means to a second position wherein the obturating means of said one conduit is removed and to a third position wherein the obturating means of said other conduit is removed, said actuating means comprising a single movable element disposed in said distribution chamber.

2. Apparatus as described by claim 1 wherein said valve actuating means comprises flapper stem means;
said one conduit obturating means being secured to said stem means;
said other conduit obturating means comprising pintle and seat means;
said pintle means being resiliently biased into fluid tight engagement with said seat means; and,
finger projection means secured to said stem means for moving said pintle means from said seat means when said stem means moves to said third position.

3. Apparatus as described in claim 2 wherein said flapper stem means is moved to said second and third positions by selective application of force means against the constant application of resilient bias urging said stem means to said first position.

4. Apparatus as described by claim 2 wherein said stem means is actuated by electromagnetic force field means;
said force field means being applied against resilient mechanical bias constantly urging said stem means to said first position; and,
said stem means being advanced to said second and third positions by respective increases in the force field intensity.

5. Apparatus as described by claim 3 wherein said propulsive system is a bipropellant fluid system; and,
said propellant flow control means comprising separate conduit means, obturating means and valve actuating means for each of said propellants.

6. Apparatus as described by claim 5 wherein the two flapper stems of the bipropellant control means are structurally secured together for simultaneous actuation but independently biased to said first position.

7. Apparatus as described by claim 1 wherein said flow control means is a bipropellant fluid control valve;
said control valve having separate fluid conduits for fuel and oxidizer, respectively;
separate flapper stem means being provided for propellant flow control in said fuel and oxidizer conduits, respectively;
each of said flapper stem means having independent resilient mechanical bias means urging respective stem means to said first position; and,
single actuating means for simultaneously moving said flapper stem means to respective second and third flow control positions.

8. In combination with a reaction propulsion engine having a main combustion chamber and a precombustion chamber;
propellant flow control valve means comprising first conduit means for directing a first flow rate of propellant to said precombustion chamber and second conduit means for directing a second flow rate of propellant to said main combustion chamber, said first and second conduit means originating from a single distribution chamber;
said first flow rate being less than said second flow rate;
first valve means for controlling propellant flow through said first conduit means;
second valve means for controlling propellant flow through said second conduit means;
actuating means comprising a single movable element disposed in said distribution chamber for operating said first and second valve means;
said actuating means having a first position wherein said first and second valve means are closed;
said actuating means having a second position wherein said first valve means is open and said second valve means is closed;
said actuating means having a third position wherein said first and second valve means are open;
resilient bias means urging said actuating means to said first position at all positions; and,
controlled force means for selectively moving said actuating means against the force of said resilient bias means to said second and third positions.

9. The combination of claim 8 wherein:
said first valve means comprises first conduit obturating means secured to said actuating means;
said second valve means comprises valve seat means disposed on valve body means, second conduit obturating means resiliently biased against said valve seat means and against the flow direction of propellant through said second conduit means; and,
abutment means secured to said actuating means for moving said second conduit obturating means away from said valve seat means to open said second conduit means when said actuating means is in said third position.

10. The combination of claim 9 comprising separate first and second conduit means for respective fuel and oxidizer propellant circuits;
respective actuating means for each of said propellant circuits;
independent resilient bias means for each of said actuating means; and,
single force means commonly operative on both of said actuating means.

References Cited

UNITED STATES PATENTS

| 2,754,656 | 7/1956 | Munger | 60—258 |
| 2,928,240 | 3/1960 | Burton | 60—240 |
| 2,981,059 | 4/1961 | Horner | 60—257 |
| 3,034,293 | 5/1962 | Ferris | 60—257 |
| 3,373,769 | 3/1968 | Chaves | 60—240 |

MARK NEWMAN, Primary Examiner

DOUGLAS HART, Assistant Examiner

U.S. Cl. X.R.

60—39.14, 39.27, 39.74, 39.82, 240